(12) United States Patent
Tsushima et al.

(10) Patent No.: US 6,463,191 B1
(45) Date of Patent: Oct. 8, 2002

(54) OPTICAL SWITCHING DEVICE AND OPTICAL SWITCHING METHOD

(75) Inventors: Hideaki Tsushima, Komae; Masahiro Ojima, Tokyo; Masaya Horino, Niihari; Kazutaka Sato, Kashiwa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/619,195

(22) Filed: Jul. 19, 2000

(30) Foreign Application Priority Data

Aug. 13, 1999 (JP) .......................................... 11-229274
Apr. 25, 2000 (JP) ....................................... 2000-128979

(51) Int. Cl.[7] .............................. G02B 6/26; G02B 6/42
(52) U.S. Cl. .......................................... 385/16; 385/20
(58) Field of Search ............................. 385/15, 16, 17, 385/18, 19, 20, 21, 22, 23, 25

(56) References Cited

U.S. PATENT DOCUMENTS 5,241,610 A * 8/1993 Labiche et al. ................ 385/16

FOREIGN PATENT DOCUMENTS

JP 07098787 11/1996
JP 009296688 5/1999

* cited by examiner

Primary Examiner—Cassandra Spyrou
Assistant Examiner—Alessandro V. Amari
(74) Attorney, Agent, or Firm—Sofer & Haroun, LLP

(57) ABSTRACT

A light emitted from the supervisory light source is supplied to the input port of any one of a plurality of switching sections provided in the optical switching device. A light emitted from the output port of the switching section is converted into electric signals and then compared with the threshold value by a supervisory receiver. The supervisory control circuit discriminates the state of connection at each switching section in the optical switching device according to the compared result obtained by the supervisory receiver, whereby each switching section in the optical switching device is supervised.

17 Claims, 10 Drawing Sheets

OPTICAL SWITCHING DEVICE AND OPTICAL SWITCHING METHOD

BACKGROUND OF THE INVENTION

This application claims priorities from Japanese Patent Application No. 11-229274 filed Jul. 27, 1999 and from Japanese Patent Application No. 2000-128979 filed Apr. 25, 2000, the entire contents of each of which are incorporated herein by reference for all purposes.

The present invention relates to a structure of an optical switching device having a plurality of light switching sections that are switched in an interlocking manner for facilitating the supervision over the state of connection of transmitting media at the respective light switching sections, and a method therefor. The invention further relates to an optical switching device having a plurality of light switching sections of one-input and two-outputs type in which a loss of light is low.

In connection with an optical switching module of the simultaneous switching type comprising integrated light switching sections for changing the state of connection of a plurality of optical fibers at a time (hereinafter referred to as an optical switching module), an optical switching module of the type described in Japanese patent Laid-Open NO. 133321/1999 is known. A conceivable device to which such an optical switching module is applied is, for example, an optical cross connect apparatus. However, an optical cross connect apparatus having such a structure has never been manufactured practically so far.

SUMMARY OF THE INVENTION

Accordingly, the first object of the invention is to facilitate the supervision over the state of connection of each light transmission medium in order to keep reliability of the optical switching device including an optical switching module. The second object of the invention is to facilitate the supervision over the state of connection of each light transmission medium and to increase the reliability of the supervision. The third object of the invention is to provide an optical switching module that is able to supervise the state of connection easily.

In order to achieve the first object, the optical switching device according to the invention comprises an optical switching module including a first light switching section for switching the input of a light or the destination of a received light and a second light switching section to be switched conjointly with the first light switching section, a first light source for emitting a light to be supplied to the first switching section, and a receiver for detecting a light from the first switching section and supplying supervised information based on the detected result.

The switching device may further comprise a supervisory control circuit that receives the incoming supervised information and controls the action of the optical switching module according to the supervised information.

The receiver according to the invention may comprise for example, a photodetector for converting a light received from the first switching section into electric signals and a discrimination decision circuit for comparing the output from the photodetector with a threshold value and supplying the compared result as supervised information.

According to another embodiment of the invention for achieving the first object described above, the optical switching device comprises a first optical switching module including a first light switching section for switching the input of a light and the destination of a received light and a second switching section to be switched conjointly with the first light switching section, a second optical switching module including a third light switching section for switching the input of a light or the destination of a received light and a forth switching section to be switched conjointly with the third switching section, an optical star coupler for dividing a received light into a light to be supplied to the first switching section in the first optical switching module and a light to be supplied into the third switching section in the second optical switching module, a first light source for emitting a light to be supplied to the optical star coupler, a first receiver for detecting a light emitted from the first switching section in the first optical switching module and supplying supervised information according to the detected result, and a second receiver for detecting a light emitted from the third switching section in the second optical switching module and supplying supervised information according to the detected result.

The switching device may further comprise a supervisory control circuit for receiving supervised information and controlling the action of the optical switching modules according to the supervised information.

The first receiver according to the invention may comprise, for example, at least a photodetector for converting a light received from the first switching section in the first optical switching module into electric signals, and a discrimination decision circuit for comparing the output from the photodetector with a threshold value and outputting the compared result as supervised information.

In order to achieve the second object, each of two optical switching devices according to the invention comprises a second light source for emitting a light, and a light switch for selectively leading either one of a light emitted from the first light source or a light emitted from the second light source into the first switching section or into the optical star coupler.

In order to achieve the third object, the invention provides an optical switching module comprising two members moving relative to each other, two light switching sections for switching the input of a light or the destination of a received light conjointly with the relative movement of the two members, and a receiver for detecting a light emitted from one of the two light switching sections and outputting the supervised information according to the detected result.

DETAILED DESCRIPTION OF THE PREFERRED EMBODIMENTS

Referring now to FIG. 1 to FIG. 9, a preferred embodiments of the invention will be described. An optical cross connect apparatus will be taken as an example of the optical switching device of the invention.

First of all, the structure of the optical switching module used in each embodiment described below will be described.

Figure 5:
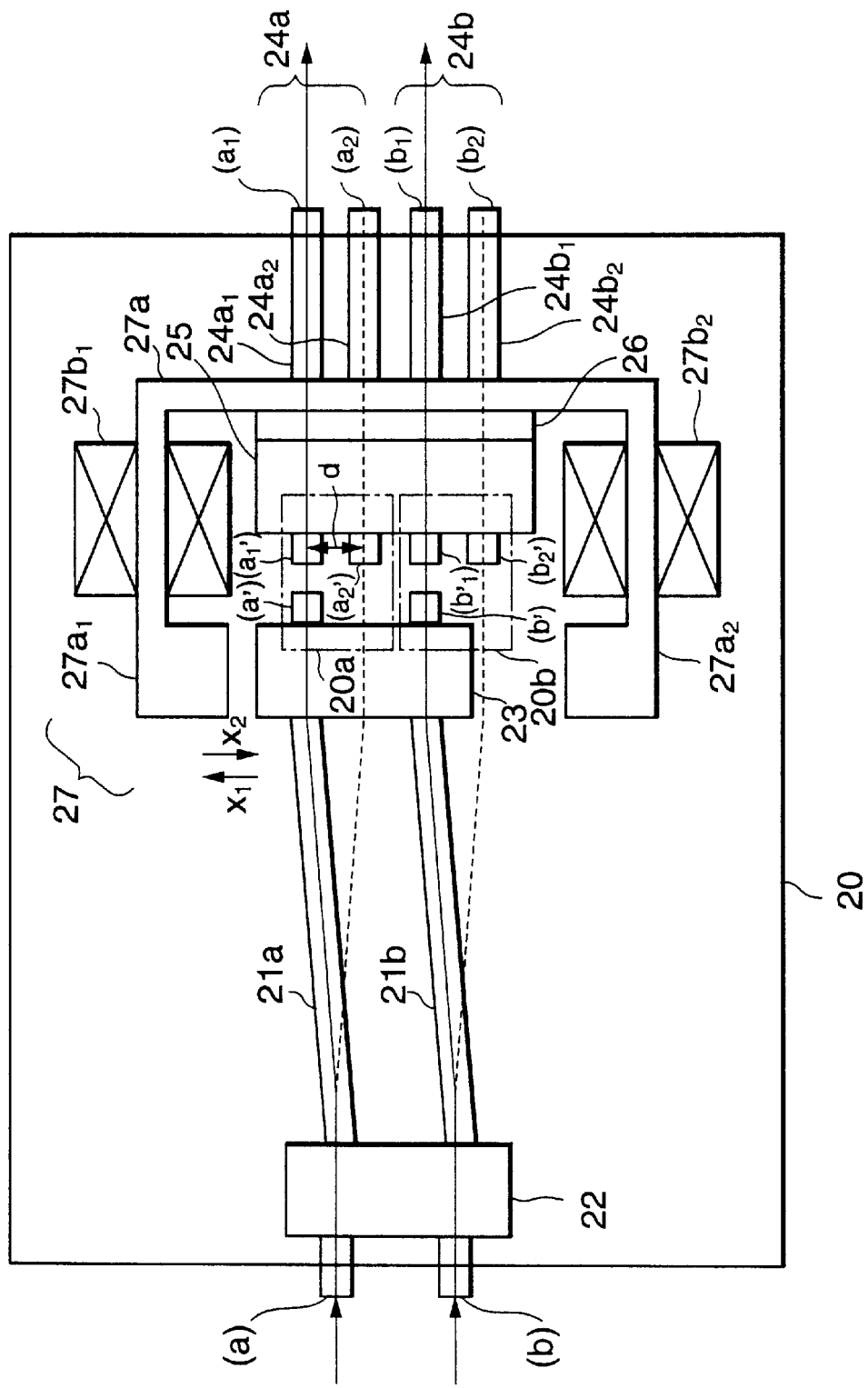
FIG. 5 is a schematic block diagram of an optical switching module to be mounted on the optical cross connect apparatus according to a embodiments of the invention.

FIG. 5 is a schematic block diagram of the optical switching module 20 according to an embodiment of the invention.

The optical switching module 20 includes a first fixed member 22, an iron-made movable member 23 movable in the directions $X_1$ and $X_2$ along the second fixed member 25, the second fixed member 25 opposing the movable member 23, a permanent magnet 26 for attracting the movable member 23 toward the second fixed member 25, an electromagnetic actuator 27 for moving the movable member 23 in the directions $X_1$ and $X_2$ along the second fixed member 25, two input-side light transmission media 21a and 21b arranged in the directions $X_1$ and $X_2$ in which the movable member 23 moves, and two output-side light transmission media 24a and 24b arranged in the directions $X_1$ and $X_2$ in which the movable member 23 moves.

In two pairs of output-side light transmission media $24a_1$, $24a_2$, and $24b_1$, $24b_2$ respectively include optical fibers, photoconductive and the like wave paths. Likewise, two input-side light transmission media 21a and 21b respectively include optical fibers, photoconductive wave paths and the like.

The two pairs of output-side light transmission media $24a_1$, $24a_2$, and $24b_1$, $24b_2$ are fixed to the second fixed member 25 with their respective input ports $(a_1')(a_2')$, $(b_1')(b_2')$ directed toward the movable member 23.

The two input-side light transmission media 21a and 21b are held on the movable member 23 with their respective output ports (a') (b') directed toward the second fixed member 25. The input-side light transmission media 21a and 21b are respectively restrained by the first fixed member 22 at appropriate distances from the respective output ports (a') (b') so that a gap is provided between the output ports (a')(b') of the input-side light transmission media 21a and 21b and the input ports $(a_1')(a_2')$, $(b_1')(b_2')$ of the output-side light transmission media $24a_1$, $24a_2$, $24b_1$, and $24b_2$ in the state that a tension is applied to the input-side light transmission media 21a, 21b by the magnetic force of the permanent magnet.

The electromagnetic actuator 27 comprises a bifurcated iron-made yoke 27a, and coils $27b_1$, and $27b_2$ respectively inserted into two legs $27a_1$, and $27a_2$ of the yoke 27a. The movable member 23 and the second fixed member 25 are arranged between the two legs $27a_1$, and $27a_2$ of the yoke 27a.

When only the coils $27b_1$ is energized, the movable member 23 moves in the direction $X_1$ toward the coil $27b_1$ by a distance corresponding to the distance d between the output-side light transmission media. When the movable member 23 stops, the output ports (a')(b') of the two input-side light transmission media 21a and 21b are respectively aligned with the input ports $(a_1')(b_1')$ of the output-side light transmission media $24a_1$ and $24b_1$ of the respective output-side light transmission media 24a and 24b, which are located closer to the coil $27b_1$ being energized. Accordingly, at the switching section 20a, the output port (a') of the input-side light transmission media 21a is connected to the input port $(a_1')$ of the output-side light transmission medium $24a_1$, and at the switching section 20b, the output port (b') of the input-side light transmission medium 21b is connected to the input port $(b_1')$ of the output-side light transmission media $24b_1$.

In contrast to it, when only the coil $27b_2$ is energized, the movable member 23 moves in the direction $X_2$ toward the coil $27b_2$ by a distance corresponding to the distance d between the output-side light transmission media. When the movable member 23 stops, the output ports (a')(b') of the two input-side light transmission media 21a and 21b are respectively aligned with the input ports $(a_2')(b_2')$ of the output-side light transmission media $24a_2$ and $24b_2$ of the respective output-side light transmission media 24a and 24b, which are located closer to the coil $27b_2$ being energized. Accordingly, at the switching section 20a, the output port (a') of the input-side light transmission medium 21a is connected to the input port $(a_2')$ of the output-side light transmission medium $24a_2$, and at the switching section 20b, the output port (b') of the input-side light transmission medium 21b is connected to the input port $(b_2')$ of the output-side light transmission medium $24b_2$.

In this way, in the optical switching module 20, when either one of the two coils $27b_1$ and $27b_2$ is energized, the input ports for lights coming out from the output ports (a') (b') of the two input-side light transmission media 21a and 21b are simultaneously switched. Therefore, the optical switching module 20 serves as a module for simultaneously switching the state of connections in a plurality of switching sections 20a and 20b for selectively emitting light coming from one input port through the two output ports.

The number of the switching sections in the optical switching module of the invention is not limited to two, but it may be three or more.

An optical cross connect apparatus using the optical switching module will now be described.

Figure 1:
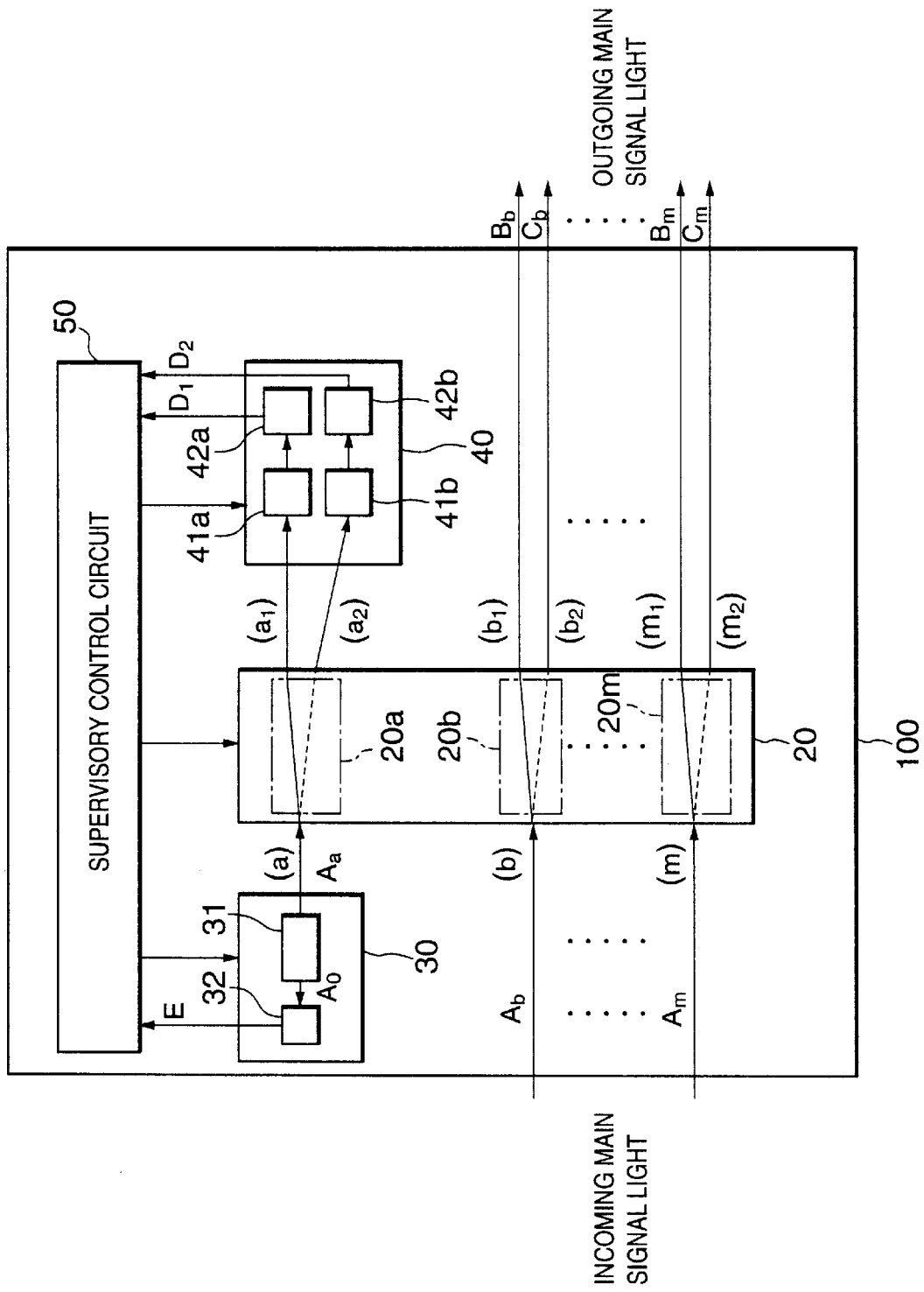
FIG. 1 is a schematic block diagram of an optical cross connect apparatus according to a first embodiment of the invention.

FIG. 1 is a schematic block diagram of the optical cross connect apparatus according to the first embodiment of the invention.

As shown in the figure, the optical cross connect apparatus 100 receives a plurality of main signal lights $A_b, \ldots, A_m$ from outside the device, and supplies those main signal lights $A_b, \ldots, A_m$ to outside the device as a plurality of main signal lights $B_b, \ldots, B_m$, or a plurality of main signal lights $C_b, \ldots, C_m$.

This optical cross connect apparatus 100 includes an optical switching module 20 having a plurality of switching sections $20a, \ldots, 20m$, a supervisory light source 30 emitting a light $A_a$ for supervising the state of the optical switching module 20 and for supplying supervised information E representing its own operating state, a supervisory receiver 40 for detecting the state of the switching section of the optical switching module 20, and a supervisory control circuit 50 for controlling the actions of respective sections 20, 30, and 40.

The supervisory light source 30 comprises a laser diode 31 for emitting laser beams $A_0$ and $A_a$ to the front and rear respectively, and a photodetector 32 for converting a laser beam $A_0$ emitted rearward into electric signals. The laser beam $A_a$ that the laser diode 31 emitted to the front is supplied to the optical switching module 20 and the output from the photodetector 32 is supplied to the supervisory control circuit 50 as information E.

Switching section 20a, . . . , 20m in the optical switching module 20 are light switching sections of one-input and two-outputs type that receive the lights Aa,Ab, . . . , Am through input ports (a), . . . , (m), and selectively output the light through one of two output ports $(a_1)$, $(a_2)$, . . . , $(m_1)$, $(m_2)$. The states of connection at these switching sections 20a, . . . , 20m are simultaneously switched by the electromagnetic actuator. In FIG. 1, the input port and the output port in the connected state at present is shown by a solid line, and those that are not connected at present are shown by a dotted line.

The input ports (b), . . . , (m) of the switching sections 20b, . . . , 20m excluding 20a are constructed so that they receive main signal lights $A_b$, . . . , $A_m$ from outside the device respectively. The respective main signal lights $A_b$, . . . $A_m$ entered into the respective input ports (b), . . . , (m) of the switching sections 20b, . . . , 20m are supplied from the respective ones of output ports $(b_1)$, . . . $(m_1)$ or the other ones of output ports $(b_2)$, . . . , $(m_2)$ of the switching sections 20b, . . . , 20m as main signal lights according to the switching state at the switching sections 20b, . . . , 20m.

The switching section 20a that does not receive a light from outside the device serves as a supervisory switching section for supervising the state of other switching sections 20b, . . . , 20m. Specifically, the switching section 20a receives an output light $A_a$ from the supervisory light source 30 through the input port (a), and supply the light $A_a$ through an output port $(a_1)$ or the other output port $(a_2)$ to the supervisory receiver 40 according to its own switching state.

The supervisory receiver 40 includes two photodetectors 41a and 41b, and discrimination decision circuits 42a and 42b associated with respective photodetectors 41a and 41b. The light emitted from one of the output port $(a_1)$ of the switching section 20a in the optical switching module is supplied to the photodetector 41a and converted into electric signals at the photodetector 41a. The output light supplied from the other output port $(a_2)$ of the switching section 20a in the optical switching module is supplied to the photodetector 41b and converted into electric signals at the photodetector 41b. The respective discrimination decision circuits 42a and 42b compare the output values from respective photodetectors 41a and 41b with the threshold value and determine whether the output values from respective photodetectors are larger or smaller than the threshold value, in other words, whether the input port and the output port are being connected or not, and supply the result to the supervisory control device 50 as supervised information $D_1$ and $D_2$. The supervisory receiver 40 may be of the type that supplies supervised information representing its own operating state to the supervisory control circuit 50.

The supervisory control circuit 50 receives respective supervised information $D_1$ and $D_2$ supplied from the two discrimination decision circuits 41a and 42b in the supervisory receiver 40, and discriminates the state of connection at the switching sections 20b, . . . , 20m according to the contents of received supervised information $D_1$ and $D_2$. More specifically, when supervised information $D_1$ supplied from the discrimination decision circuits 42a indicates that the input port (a) and one of the output ports $(a_1)$ of the switching section 20a are in the connected state, the supervisory control circuit 50 discriminates that the input port (b), . . . , (m) and one of the output ports $(b_1)$, . . . , $(m_1)$ are also in the connected state in other switching sections 20b, . . . , 20m, and when supervised information $D_2$ supplied from the other discrimination decision circuit 42b indicates that the input port (a) and the other output port $(a_2)$ of the switching section 20a are in the connected state, the supervisory control circuit 50 discriminates that the input port (b), . . . , (m) and the other output port $(b_2)$, . . . $(m_2)$ are in the connected state in other switching sections 20b, . . . , 20m. By means of this discriminating capability, the supervisory control circuit 50 supervises the state of connection at the switching section 20b, . . . , 20m in the optical switching module 20. The supervisory control circuit 50 further has a function to control the switching operation of the optical switching module 20 according to supervised information obtained from the supervisory receiver 40, a function to control the ON-OFF switching operations of the supervisory light source 30 and supervise the state of such operations according to the status signal E, and a function to control the ON-OFF switching operations of the supervisory receiver 40.

As is apparent from the description thus far, since the optical switching module 20 allows all the switching section 20a, . . . , 20m to be switched simultaneously, the optical cross connect apparatus 100 of the invention is able to supervise the state of connection in other switching sections 20b, . . . , 20m by supervising the state of connection in one of switching section out of the switching sections 20a, . . . , 20m in the optical switching module 20 as a representative switching section.

The supervisory receiver 40 is provided with the discrimination decision circuits 42a and 42b and the discriminated results obtained by the discrimination decision circuits 42a and 42b are supplied to the supervisory control circuit 50 as supervised information $D_1$ and $D_2$ in this embodiment. However, in the case where the supervisory control circuit 50 is provided with the same discriminating capability as in the discrimination decision circuits 42a and 42b, the structure that the outputs of the photodetectors 41a and 41b are directly supplied to the supervisory control circuit 50 may be employed without providing the discrimination decision circuits 42a and 42b in the supervisory receiver 40.

Figure 8:
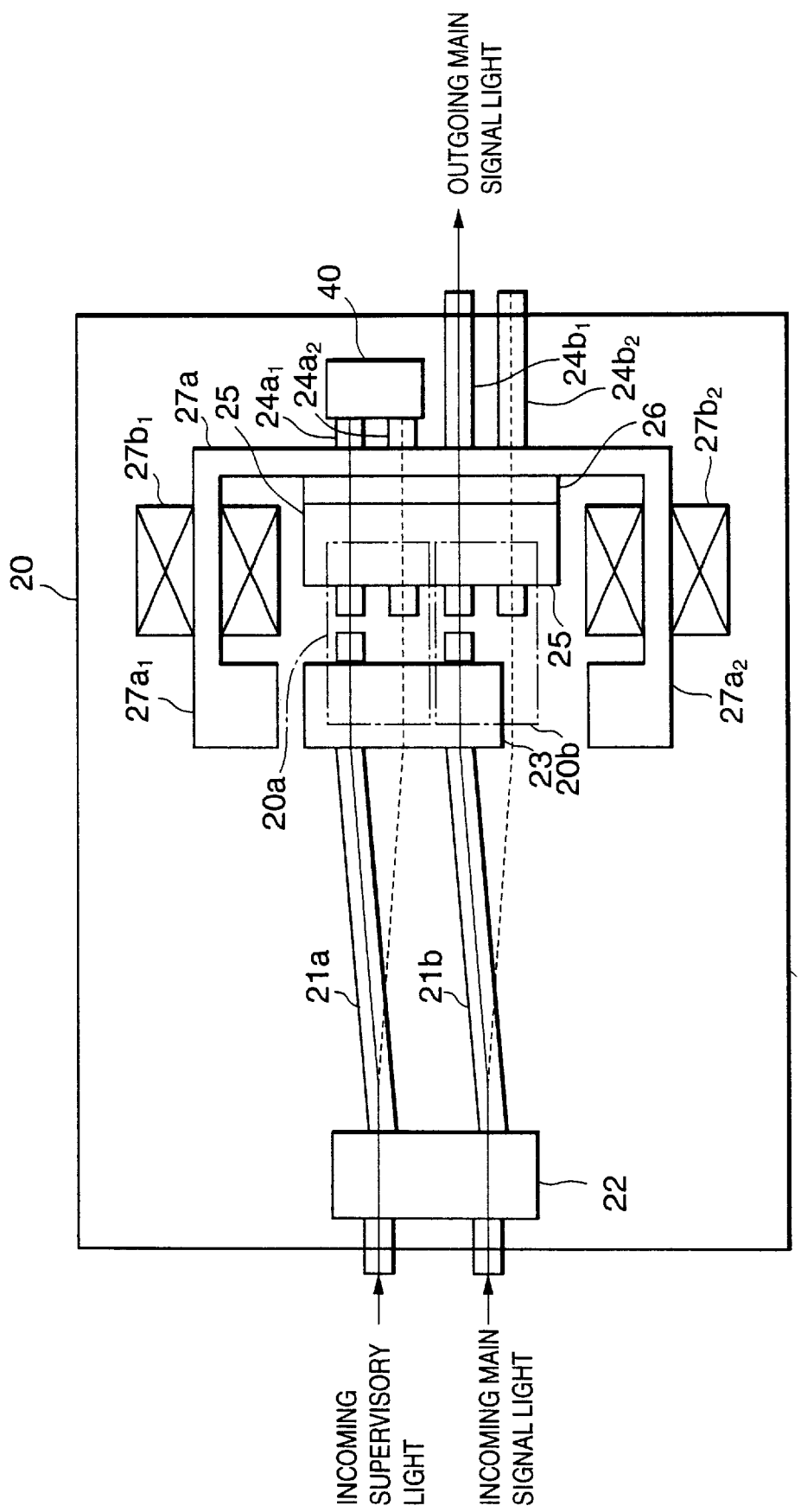
FIG. 8 is a schematic block diagram of another optical switching module to be mounted on the optical cross connect apparatus according to an embodiment of the invention.

In addition, though the optical switching module 20 and the supervisory receiver 40 are separately provided in this embodiment, it is also possible to integrate the supervisory receiver 40 in the light switch module 20 as shown in FIG. 8 and connect the respective output-side light transmission media $24a_1$ and $24a_2$ of the supervisory switching section 20a to the supervisory receiver 40.

Figure 2:
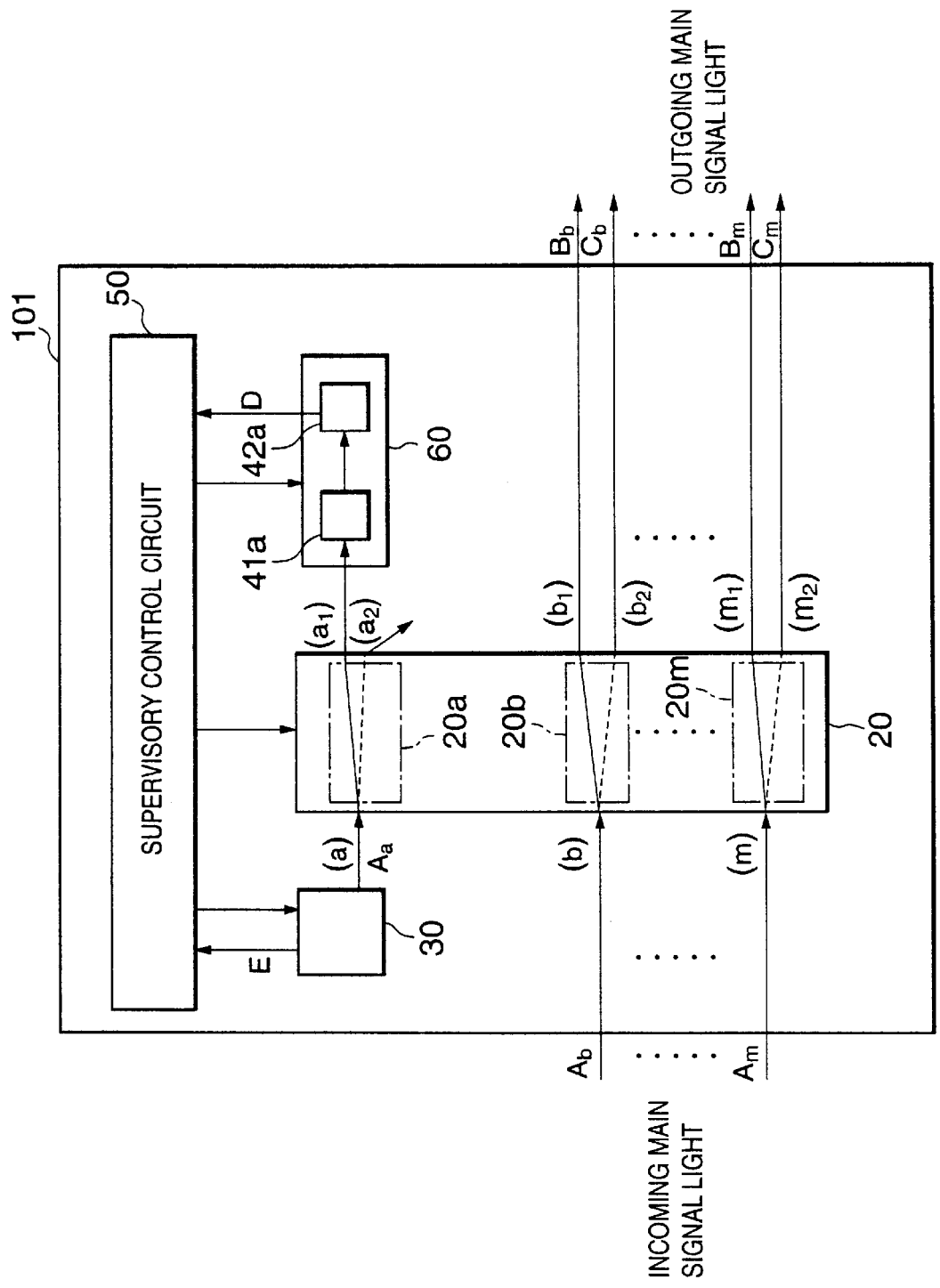
FIG. 2 is a schematic block diagram of an optical cross connect apparatus according to a second embodiment of the invention.

FIG. 2 is a schematic block diagram of the optical cross connect apparatus according to the second embodiment of the invention. The identical numerals and signs are used for the identical components in FIG. 1 and FIG. 2.

As shown in the figure, the optical cross connect apparatus 101 as well as optical cross connect apparatus 100, receives input from a plurality of main signal lights $A_b$, . . . , $A_m$ from outside the device and supplies those main signal lights $A_b$, . . . , $A_m$ as a plurality of main signal lights $B_b$, . . . , $B_m$ or a plurality of output lights $C_b$, . . . , $C_m$ to outside the device.

The optical cross connect apparatus 101 comprises a supervisory receiver 60 that is different from the one in the optical cross connect apparatus 100 shown in FIG. 1. As regards other components 20, 30, and 50 are the same as ones in the optical switching module shown in FIG. 1.

The supervisory receiver 60 in the optical cross connect apparatus 101 receives the output light only from one of the output ports ($a_1$) of the supervisory switching section 20a of the optical switching module 20. The output light from the other output port ($a_2$) of the supervisory switching section 20a is not received by the supervisory receiver 60 and abandoned. Therefore, the supervisory receiver 60 of the optical cross connect apparatus 101 is provided with one photodetector 41 and one discrimination decision circuit 42 integrated therein. The photodetector 41 convert the output light from the output ports ($a_1$) of the supervisory switching section 20a into electric signals, and the discrimination decision circuit 42 supplies the result obtained by the comparison between the electric signals and the threshold value to the supervisory control circuit 50 as in the case of the photodetector 41a and the discrimination decision circuit 42a shown in FIG. 1.

In this way, the reason why the photodetector 41 and the discrimination decision circuit 42 are provided only for the output ports ($a_1$) of the supervisory switching section 20a in the optical switching module 20 is that the supervisory control circuit 50 can discriminate which one of the output ports ($a_1$) and ($a_2$) of the supervisory switching section 20a is in the state of connection with the input port (a) of the supervisory switching section 20a only by supervising supervised information D that indicates the state of connection between the input port (a) and the output ports ($a_1$) of the supervisory switching section 20a, and the status signal E that indicates the operating state of the supervisory light source 30. In other words, since the input port (a) of the supervisory switching section 20a is connected with one of the two output ports ($a_1$) and ($a_2$), the supervisory control device 50 can discriminate that input port (a) of the supervisory switching section 20a is connected to the output ports ($a_1$), as far as one of the output ports ($a_1$) of the supervisory switching section 20a supplies an output in the state that the supervisory light source 30 is being driven. In contrast to it, since the output ports ($a_1$) of the supervisory switching section 20a supplies no output in the state that the supervisory light source 30 is being driven, the supervisory control device 50 can discriminate that the input port (a) of the supervisory switching section 20a is connected to the other output port ($a_2$).

When the photodetector and the discrimination decision circuit is satisfactorily reliable, such a structure allows reduction of the number of the photodetectors and the discrimination decision circuits, whereby an optical cross connect apparatus having a structure simpler than the optical cross connect apparatus 100 shown in FIG. 1 may be realized.

Though the optical cross connect apparatus having a light switch module is described thus far as an embodiment of the invention, the invention is also applicable to the optical cross connect apparatus having a plurality of optical switching modules. The case where the optical switching module having a plurality of optical switching modules is applied to the optical cross connect apparatus will now be described.

Figure 3:
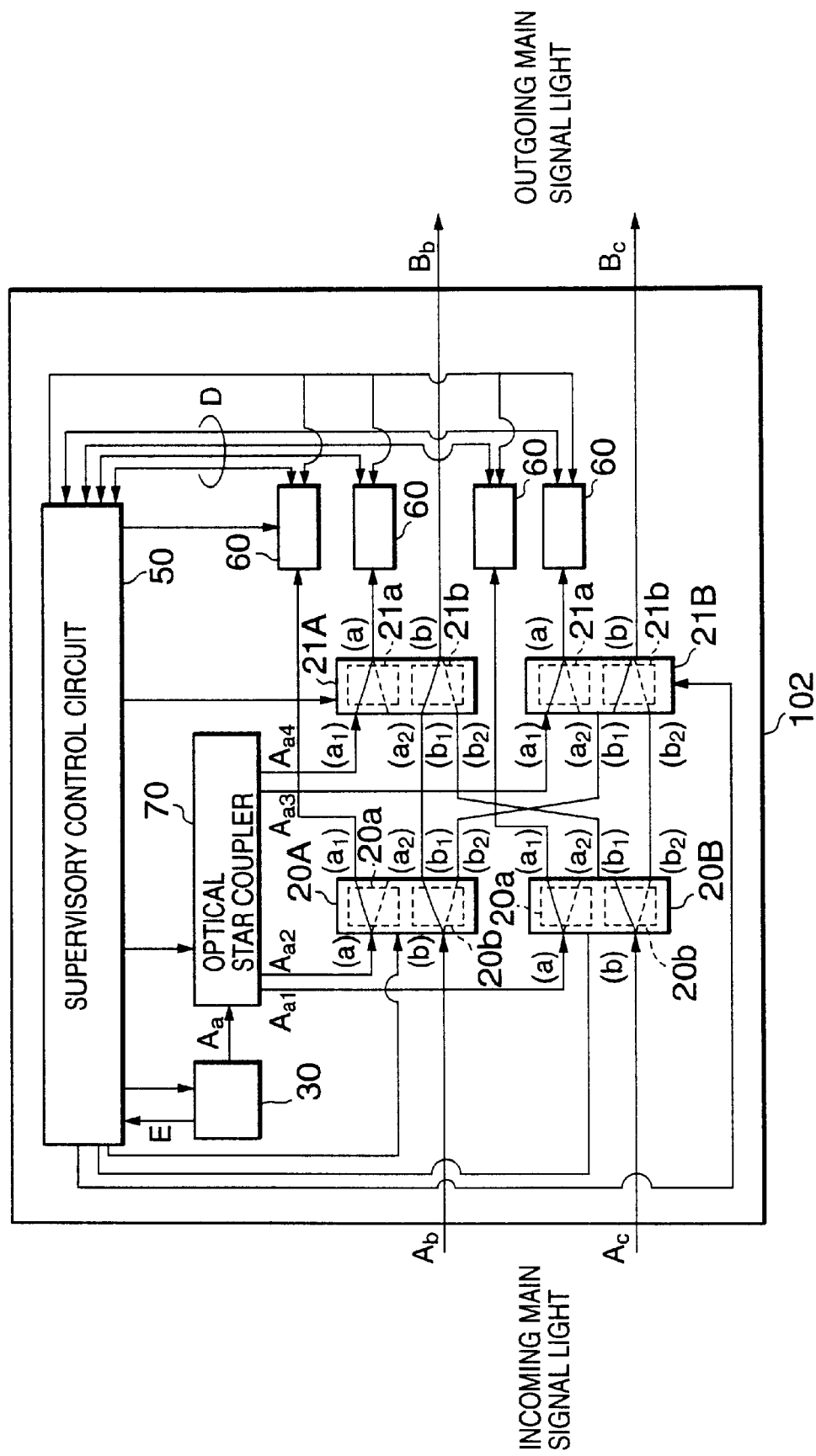
FIG. 3 is a schematic block diagram of an optical cross connect apparatus including a plurality of modules according to a third embodiment of the invention.

FIG. 3 is a schematic block diagram showing an optical cross connect apparatus 102 according to the third embodiment of the invention wherein a plurality of optical switching module that are to be supervised are provided. The identical numerals and signs are used in FIG. 3 for the components that are identical to those shown in FIG. 1 or FIG. 2.

As shown in the figure, the optical cross connect apparatus 102 serves to receive two main signal lights $A_b$ and $A_c$ from outside the device, and switch the destination of the main signal lights $A_b$ and $A_c$.

The optical cross connect apparatus 102 comprises four optical switching modules 20A, 20B, 21A and 21B having two switching sections respectively, a supervisory light source 30, an optical star coupler 70 for dividing the light $A_a$ emitted from the supervisory light source 30 into lights $A_{a1}$, $A_{a2}$, $A_{a3}$, $A_{a4}$ as many as the number of the switching modules, a supervisory receiver 60 associated with each optical switching modules 20A, 20B, 20C, and 20D, and a supervisory control circuit 50 for controlling the operation of each section 20A, 20B, 21A, 21B, 70 and 60.

Switching sections 20a and 20b in respective optical switching modules 20A and 20B are light switching sections of one-input and two-outputs type, and each of the light switching section receives a light from an input port (a), (b), and selectively supplies the light through one of the two output ports ($a_1$) or ($a_2$) and ($b_1$) or ($b_2$). In other words, each switching section 20a and 20b of the optical switching modules 20A and 20B serves to switch the destination of the main signal lights $A_b$ and $A_c$ received from an input port (b), (b) between two output ports ($b_1$) and ($b_2$). These two optical switching modules 20A and 20B serve to switch two switching sections 20a and 20b simultaneously as well.

The input port (b) of the switching section 20b in each optical switching module 20A and 20B receives a main signal light $A_b$ and $A_c$ from outside the device. Therefore, the main signal light $A_b$ coming from outside the device is supplied through one of two output ports ($b_1$) and ($b_2$) of the switching section 20b according to the state of connection in the switching section 20b in the optical switching module 20A, and the main signal light $A_c$ coming from outside the device is supplied through one of two output ports ($b_1$) and ($b_2$) of the switching section 20b according to the state of connection in the switching section 20b of the optical switching module 20B.

In such optical switching modules 20A and 20B, the switching section 20a that does not receive light from outside the device serves as supervisory switching sections respectively. More specifically, the switching section 20a of each optical switching module 20A and 20B receives a light $A_{a1}$, $A_{a2}$ emitted from the star coupler 70 in the input port (a) and either supply the light $A_{a1}$, $A_{a2}$ through one of the output ports ($a_1$) to the supervisory receiver 60 or just output through the other output port ($a_2$) according to its own switching state.

The remaining two optical switching modules 21A and 21B have the same structure as the optical switching modules 20A and 20B, except for the fact that the input and output of the light is reverse of the optical switching modules 20A and 20B. Therefore, the respective switching sections 21a and 21b in the optical switching modules 21A and 21B serve as light switching section of two-input and one-output type that receive light through two input ports ($a_1$), ($a_2$), ($b_1$), ($b_2$) and supply the light received from one of the input ports through the output ports (a) and (b). The two input ports ($b_1$) and ($b_2$) of the switching section 21b in the optical switching modules 21A out of these two optical switching modules 21A and 21B receive light from the output ports ($b_1$) of the switching sections 20b in the optical switching modules 20A and 20B. Therefore, from the switching section 21b of the optical switching module 21A, light supplied from the output port ($b_1$) of the switching section 20b in the optical switching module 20A, or light supplied from the output port ($b_1$) of the switching section 20b in the optical switching module 20B is supplied.

The two input ports ($b_1$) and ($b_2$) of the switching section 20b in the optical switching module 21B receives light coming out from the output ports ($b_2$) of the switching sections 20b in the optical switching modules 20A and 20B. Therefore, from the switching section 21b of the optical switching module 21B, light coming out from the output port ($b_2$) of the switching section 20b in the optical switching module 20A or light coming from the output port ($b_2$) of the switching section 20b in the optical switching module 20B is supplied.

In such optical switching modules 21A and 21B, the switching sections 21a that do not receive light from the optical switching modules 20A and 20B serve as supervisory switching sections respectively. More specifically, the switching section 21a of each optical switching module 21A and 21B receives light $A_{a3}$ and $A_4$ emitted from the star coupler 70 in the input port ($a_1$) and supplies the light $A_{a3}$ and $A_{a4}$ through the output port (a) to the supervisory receiver 60 according to its own switching state. The other input port ($a_2$) of the switching section 21a in the respective optical switching modules 21A and 21B does not receive any input.

When the optical cross connect apparatus 102 supplies the main signal light Ab as a main signal light $B_b$ and the main signal light $A_c$ as a main signal light $B_c$, the switching sections in each switching module 20A, 20B, 21A, and 21B are switched as follows.

At the switching section 20b in the optical switching module 20A, the input port (b) is connected to the output port ($b_1$), and at the switching section 21b of the optical switching module 21A, the input port ($b_1$) is connected to the output port (b). In such a state of connection, the main signal light $A_b$ coming from outside the device is supplied via two light switch modules 20A and 21A to outside the device as a main signal light $B_b$. At this time, at the supervisory switching section 20a of the optical switching module 20A, the input port (a) is connected to the output port ($a_1$), and at the supervisory switching section 21a in the optical switching module 21A, the input port ($a_1$) is connected to the output port (a). Accordingly, the supervisory receivers 60 being associated with the respective optical switching modules 20A and 21A receive the lights $A_{a2}$ and $A_{a4}$ coming from the optical star coupler 70 via the respective optical switching modules 20A and 21A.

At the switching section 20b in the optical switching module 20B, the input port (b) is connected to the output port ($b_1$) and at the optical switching modules 21B, the input port ($b_2$) is connected to the output port (b). In such a state of connection, the main signal light $A_c$ is supplied via the optical switching modules 20B and 21B as a main signal light $B_c$. At this time, at the supervisory switching section 20a in the optical switching module 20B, the input port (a) is connected to the output port ($a_2$), and at the supervisory switching section 21a in the optical switching module 21B, the input port ($a_2$) is connected to the output port (a). Therefore, the supervisory receivers 60 being associated with the optical switching modules 20B and 21B receive nothing.

On the other hand, when the optical cross connect apparatus 102 supplies a main signal light $A_b$ as a main signal light $B_c$ and a main signal light $A_c$ as a main signal light $B_b$, the switching sections of each optical switching module 20A, 20B, 21A, 21B are switched as follows.

At the switching section 20b in the optical switching module 20A, the input port (b) is connected to the output port ($b_2$), and at the switching port 21b in the optical switching module 21B, the input port (b,) is connected to the output port (b). In such a state of connection, a main signal light $A_b$ coming from outside the device is supplied via two optical switching modules 20A and 21B to outside the device as a main signal light $B_c$. At this time, at the supervisory switching section 20a in the optical switching module 20A, the input port (a) is connected to the output port ($a_2$) and at the supervisory switching section 21a in the optical switching module 21B, the input port ($a_1$) is connected to the output port (a). Therefore, the supervisory receiver 60 being associated with the optical switching module 20A receives nothing, and the supervisory receiver 60 being associated with the optical switching module 21B receives a light $A_{a3}$ coming from the optical star coupler 70 via the optical switching module 21B.

At the switching section 20b in the optical switching module 20B, the input port (b) is connected to the output port ($b_1$), and at the switching section 21b in the optical switching module 21A, the input port ($b_2$) is connected to the output port (b). In such a state of connection, a main signal light $A_c$ coming from outside the device is supplied via two optical switching modules 20B and 21A to outside the device as a main signal light $B_b$. At this time, at the supervisory switching section 20a in the optical switching module 20B, the input port (a) is connected to the output port ($a_1$), and at the supervisory switching section 21a in the optical switching module 21A, the input port ($a_2$) is connected to the output port (a). Therefore, the supervisory receiver 60 being associated with the optical switching module 20B receives a light $A_{a1}$ from the optical star coupler 70 via the optical switching module 20B and the supervisory receiver 60 being associated with the optical switching module 21A receives nothing.

The supervisory control device 50 can supervise the state of connection at the switching sections 20b and 21b in each optical switching module 20A, 20B, 21A, and 21B by supervising the status signal E representing the operating state of the supervisory light source 30 and supervised information D supplied from each supervisory switching section 60 while each switching module 20A, 20B, 21A and 21B are in operation.

As is apparent from the description above, even when the optical cross connect apparatus is provided with a plurality of optical switching modules, a structure shown in FIG. 3 enables supervising of the state of connection at the switching sections in each optical switching module without providing supervisory light sources as many as the number of the optical switching modules. Therefore, since it is not necessary to increase the number of the supervisory light sources, the cost may be decreased.

Though the supervisory receiver that is the same as the one 60 shown in FIG. 2 is used as a supervisory receivers 60 being associated with the optical switching modules 20A and 20B having one-input and two-outputs switching sections 20a and 20b in this embodiment, it is also possible to use a supervisory receiver as the one 40 shown in FIG. 1. In this case, outputs from both of the two output ports ($a_1$) and ($a_2$) of the supervisory switching section 20a in each optical switching modules 20A and 20B are supplied into the supervisory receiver.

Though the structure of the optical cross connect apparatus of two-inputs and two-outputs type having four optical switching modules is shown in FIG. 3, the invention is applicable to any optical cross connect apparatus of p-inputs and q-outputs (p, q=natural number) type having a plurality of optical switching modules.

Figure 4:
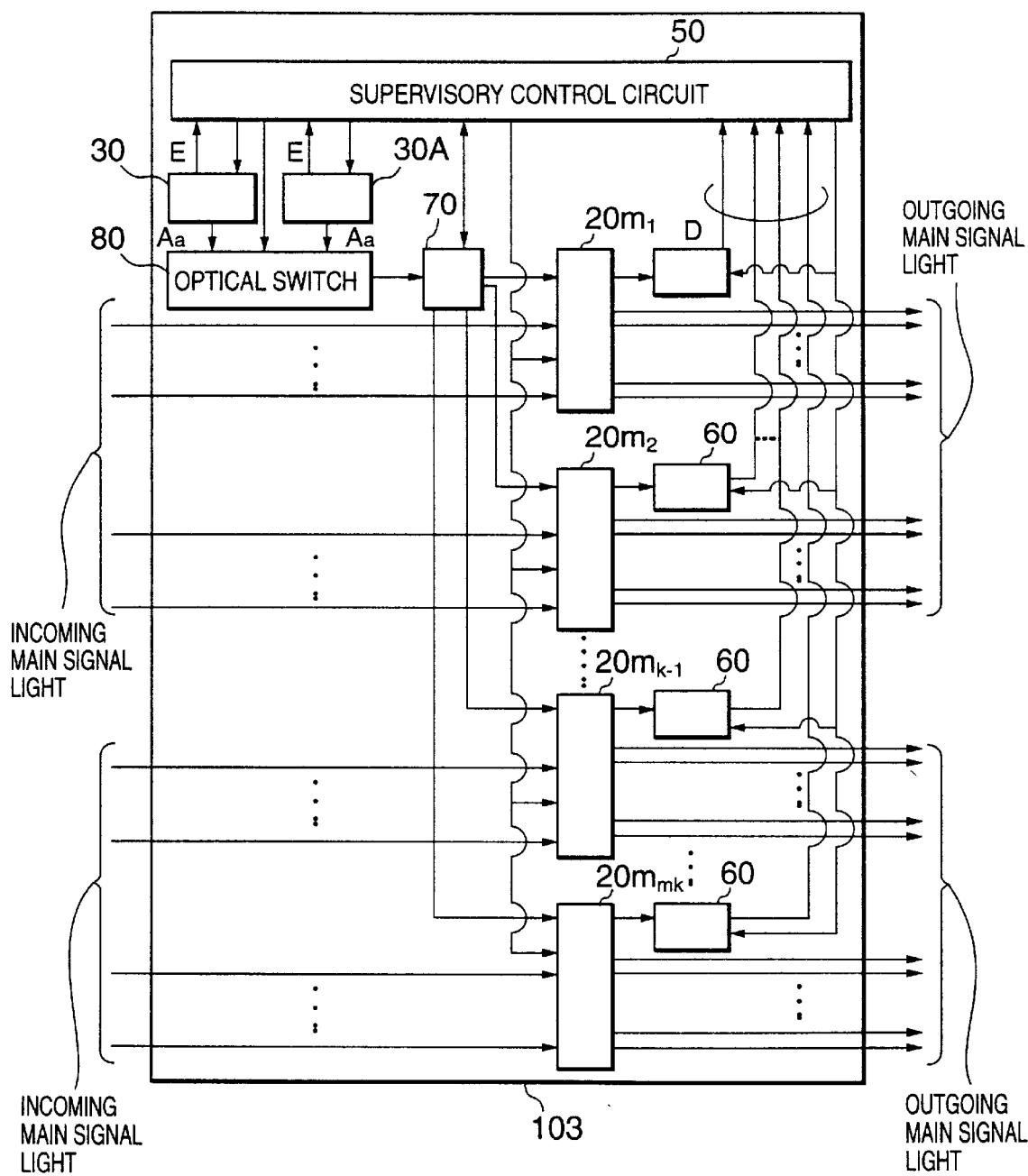
FIG. 4 is a schematic block diagram of an optical cross connect apparatus including two supervisory light sources according to a fourth embodiment of the invention.

FIG. 4 is a schematic block diagram of an optical cross connect apparatus 103 having two supervisory light sources according to the fourth embodiment of the invention. The identical numerals and signs are used in FIG. 4 for the components that are identical to ones shown in FIG. 1 to FIG. 3.

As shown in the figure, the optical cross connect apparatus 103 comprises a supervisory light source 30 for current use, and another spare supervisory light source 30A having the same structure. The optical cross connect apparatus 103 has a redundancy that the spare supervisory light source 30A may be used as an alternative in case where a malfunction of the supervisory light source 30 for current use occurs.

The optical cross connect apparatus 103 comprises a plurality of optical switching modules $20m_1, \ldots, 20m_k$, two supervisory light sources 30 and 30A, a light switch 90 of 2-inputs and 1-output type for selectively supplying a light $A_a$ from either one of two supervisory light sources 30 and 30A, an optical star coupler 70 for dividing the output light from the light switch 90 into the number of lights as many as the number of the optical switching modules, a supervisory receivers 60 being associated with optical switching modules $20m_1, \ldots 20m_k$, and a supervisory control circuit 50 for controlling the operation of each sections $20m_1, \ldots, 20m_k$, 30, 30A, 90, 70, and 60.

The light switch 80 receives lights $A_a$ from the two supervisory light sources 30 and 30A and selectively supplies either one of those lights $A_a$ according to the instruction of the supervisory control circuit 50. Though a light $A_a$ is generally supplied from the supervisory light source 30 for current use 30, when the supervisory control circuit 50 detects an occurrence of a malfunction according to the status signal E supplied from the supervisory light source 30 for current use, the light switch 80 supplies a light $A_a$ from the spare supervisory light source 30A instead of the light $A_a$ from the supervisory light source 30 for current use.

Each switching module $20m_1, \ldots, 20m_k$ is provided with a plurality of switching sections of 1-input and 2-outputs type as the optical switching module 20 (=in FIG. 1), and one of these switching sections is used as a supervisory switching section. The supervisory switching section receives a light divided in the optical star coupler 70, as is shown in FIG. 3.

The supervisory receivers 60 being associated with optical switching modules $20m_1, \ldots, 20m_k$ receive a light according to the state of connection at each supervisory switching section and supply supervised information D showing the state of connection at each supervisory switching section to the supervisory control device 50. The supervisory control device 50 discriminates the state of connection at the switching section in each optical switching module $20m_1, \ldots, 20m_k$ by the same process as in the supervisory control device shown in FIG. 2 based on supervised information D from each supervisory receiver 60 and status information E from the supervisory light source in service.

Since the optical cross connect apparatus 103 according to this embodiment has redundancy in terms of having a plurality of supervisory light source, supervision of the state of connection in each optical switching module $20m_1, \ldots, 20m_k$ is highly reliable.

Though the light switch 80 is used for switching light emitted from two supervisory light sources 30 and 30A in this embodiment, it is also possible to use an optical coupler of 2-inputs and 1-output type that supply light coming from the two input ports through one output port instead of the light switch 80. Since the light emitted from two supervisory light sources 30 and 30A is multiplexed and supplied through the output port of the optical coupler having 2-inputs and 1-output, even when a malfunction of either one of the supervisory light sources 30 and 30A occurs, the power of the light incoming to the supervisory switching section in each switching module will be cut in half but will never become zero. However, even when the output port of the optical coupler having 2-inputs and 1-output is used, the power of the light incoming to the supervisory switching section in each optical switching module will be held constant if the other supervisory power source is driven only when a malfunction of one of the supervisory light sources occurs by the control of the supervisory control circuit 50.

The summary of the method for supervising the optical switching module employed in the optical cross connect apparatus described above is as follows.

Figure 10:
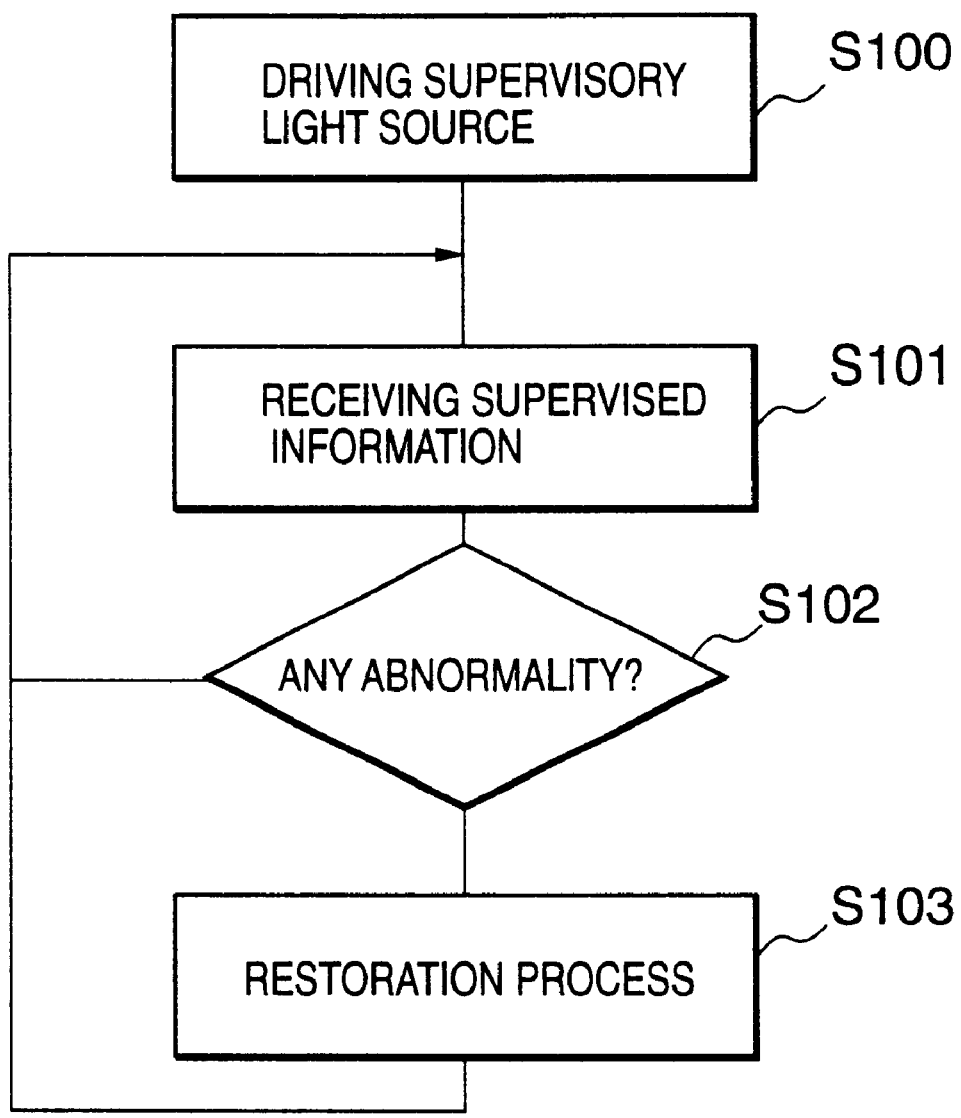
FIG. 10 is a flow chart showing processes in optical switching module supervising method according to the invention.

The supervisory control device performs processes shown in the flow chart in FIG. 10.

As a first step, the supervisory light source is driven (step 100). Then a light from the supervisory light source is supplied to the supervisory switching section in the optical switching module. As shown in FIG. 3, in case where there are provided a plurality of optical switching modules, a light emitted from the supervisory light source is divided at the optical star coupler and supplied into the respective supervisory switching sections in a plurality of optical switching modules.

While the supervisory light source is being driven, the supervisory light source successively supplies supervised information representing its own state to the supervisory control device. At the supervisory receiver being associated with the supervisory switching section in the optical switching module, the photodetector converts the output light of the supervisory switching section into the electric signals successively, and the discrimination decision circuit compares the output of the photodetector with the threshold value successively and supplies the compared result into the supervisory control device as supervised information successively (step 101). As shown in FIG. 3, in case where a plurality of optical switching modules are provided, the supervisory receiver being associated with the supervisory switching section in each optical switching module performs the same process in this step.

Upon receipt of supervised information from the supervisory switching section in the optical switching module and supervised information from the supervisory light source, the supervisory control device discriminates the state of connection of the optical switching module according to the received supervised information (step 102).

If any abnormality is found, the restoration process is performed (step 103). More specifically, when the state of connection in the optical switching module is found to be abnormal, the supervisory controlling section switches all the switching sections in the optical switching module in question.

On the other hand, when the state of connection in the optical switching module is found to be normal, the supervisory control device continues the same process (step 101, step 102) as before.

Since the state of connection at the switching section in the optical switching module is supervised by these processes, the reliability of the system increases. In case where a plurality of supervisory light sources are provided as shown in FIG. 4, the reliability of the system further improves by constructing the system in such a manner that the supervisory controlling device discriminates the state of the supervisory light source in current use according to supervised information at step 102, and when the state is found to be abnormal, the supervisory controlling device changes over the light switch at step 103, so that a light from the spare supervisory light source is supplied through the light switch instead of the light from the supervisory light source in current use.

The optical cross connect apparatus of the embodiments described thus far is provided with one or more supervisory light sources. However, the optical cross connect apparatus having no supervisory light source is also applicable as an embodiment of the invention. Hereinafter, the optical cross connect apparatus having no supervisory light source will be described. While the optical cross connect apparatus having no supervisory light source is realized by modifying the optical cross connect apparatus 100 shown in FIG. 1, it is also possible to realize the optical cross connect apparatus having no supervisory light source by modifying each optical cross connect apparatus shown in FIG. 2 to FIG. 4.

Figure 11:
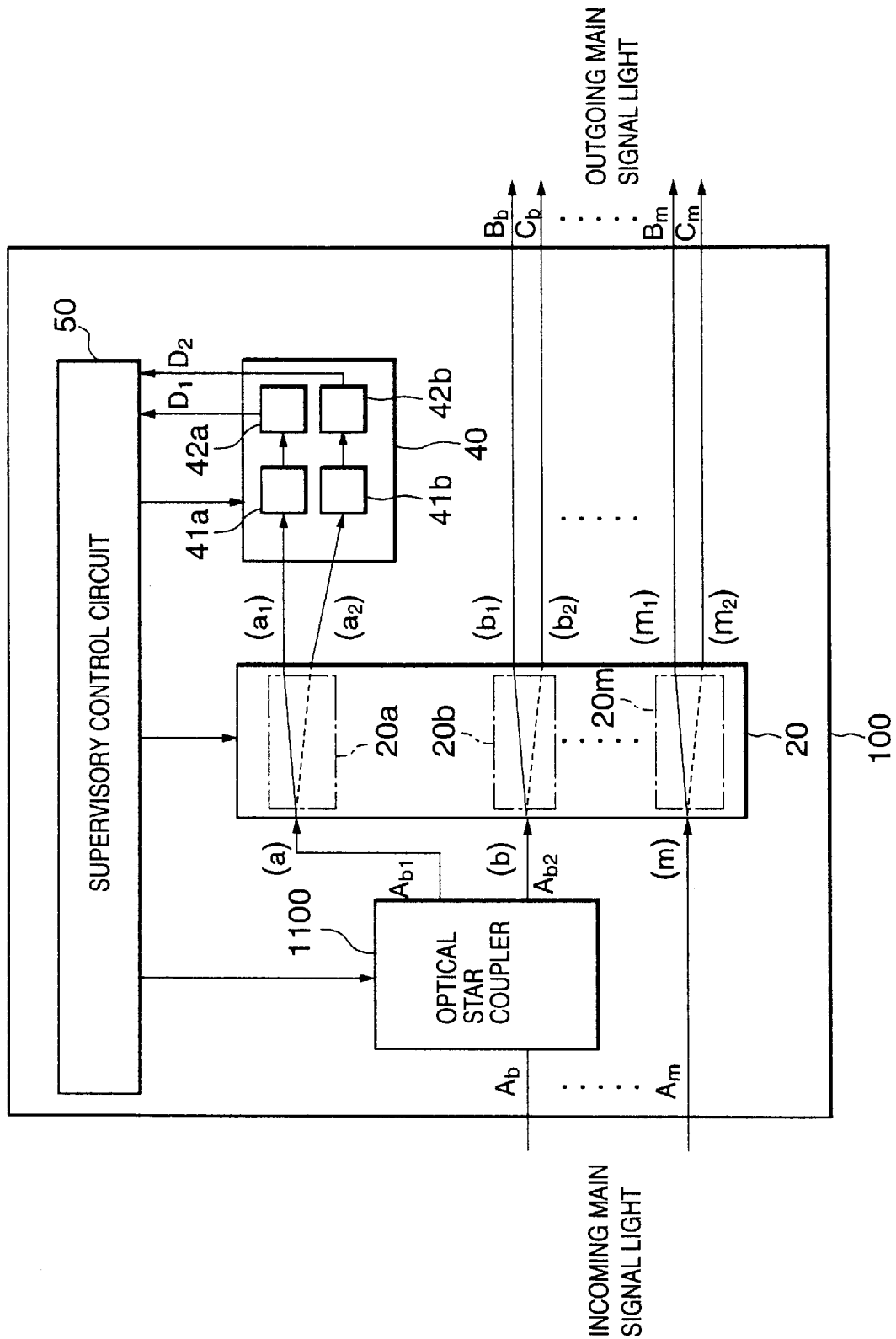
FIG. 11 is a schematic block diagram of an optical cross connect apparatus that does not include a supervisory light source according to a fifth embodiment of the invention.

FIG. 11 is a schematic block diagram of an optical cross connect apparatus 100' according to the fifth embodiment of the invention, wherein no supervisory light source is provided. The identical reference numerals and signs are used for the components shown in FIG. 11 that are identical to the components shown in FIG. 1.

As shown in the figure, the optical cross connect apparatus 100' differs from the optical cross connect apparatus 100 shown in FIG. 1 in that no supervisory light source 30 is provided and, instead, an optical star coupler 1100 is provided.

The optical star coupler 1100 divides the main signal light $A_b$ supplied from outside the device into two lights $A_{b1}, A_{b2}$ before advancing into a switching section 20b. The light $A_{b2}$ is guided to the input port (b) of the switching section 20b, and the other light $A_{b1}$ is guided to the input port (a) of the supervisory switching section 20a. In other words, in the structure shown in FIG. 11, since the main signal light is divided into two lights and one of these two lights is used as a light to be supplied to the input port of the supervisory switching section 20a, a supervisory light source is not provided. In such an arrangement, by driving the optical star coupler instead of driving the supervisory light source by the supervisory control circuit 50 as in the process of step 100 shown in FIG. 10, the state of connection at the optical switching module may be supervised.

Though the optical cross connect apparatus to which the invention is applied has been described so far, the invention is not limited to the optical cross connect apparatus, but it is also applicable in general to the optical switching device that switches the light transmission path. Hereinafter the optical switching device to which the invention is applied will be described.

Figure 9:
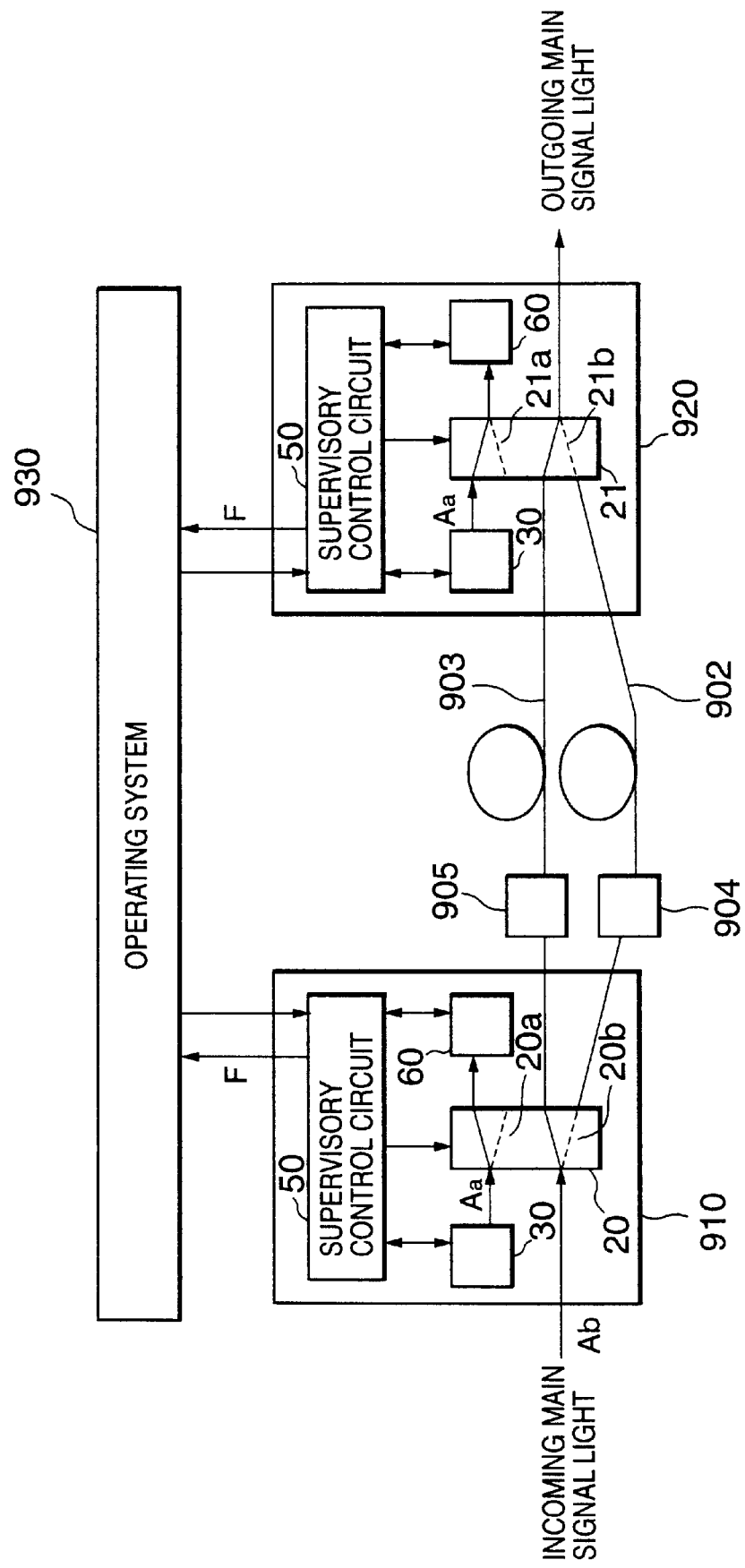
FIG. 9 is a schematic block diagram of a system to which the optical switching device according to the invention is applied.

FIG. 9 is a block diagram of the light communication system to which the optical switching device of the invention is applied. In FIG. 9, the identical reference numerals and signs are given to components that are identical to the components shown in FIG. 1 to FIG. 8.

The light transmission system comprises a transmission-side optical switching device 910 to which the main signal light $A_b$ from the light sending device is supplied, a receiving-side optical switching device 901 for sending the main signal light to the light receiving device, two light transmission paths 902 and 903 formed of an optical fiber or the like provided between two optical switching devices 910 and 920, transmission devices for current use 904 and 905 provided on the light transmission paths 902 and 903 respectively, and an operation system 930 for supervising two optical switching devices 910 and 920 respectively.

The transmission devices for current use 904 and 905 include a light amplifier, a transit optical cross connect apparatus, and a regenerative repeater, for example.

Out of two light transmission paths 902 and 903, a light transmission path 902 is uses as a light transmission path for current use, and the other light transmission path 903 is used as a spare light transmission path to be used when a malfunction of the light transmission path 902 for current use occurs. In order to use these light transmission paths 902 and 903 in this way, the transmission-side optical switching device 910 switches the destination of the main signal light between two light transmission paths 902 and 903 according to the control instruction supplied from the operating system 930, and the receiving-side optical switching device 920 switches the source of the main signal light between two light transmission paths 902 and 903 according to the control instruction supplied from the operating system 930.

The transmission-side optical switching device 910 has the same structure as the optical cross connect apparatus 101 shown in FIG. 2, provided that the switching sections 20b except for the supervisory switching section 20a has a light transmission device connected to the input port and light transmission paths 202 and 903 connected to two output ports respectively. Therefore, in the transmission-side optical switching device 910, the supervisory control circuit 50 supervises the state of connection between the light transmission device and the respective light transmission paths 902 and 903.

On the other hand, the receiving-side switching device 950 comprises an optical switching module 21, a supervisory light source 30, a supervisory receiver 60, and a supervisory control device 50. The optical switching module 21 in the transmission-side switching device 950 has the same structure as the optical switching module 21A shown in FIG. 3, except that the switching sections 21b excluding the supervisory switching section 21a have light transmission paths 902 and 903 connected to two input ports thereof, and a light receiving device connected to the output port. Therefore, in the receiving-side optical switching device 950, the supervisory control circuit 50 supervises the state of connection between the light receiving device and the respective light transmission paths 902 and 903.

In this light transmission system, supervised information F representing the state of connection in the respective light switch modules 20 and 21 is transmitted from the supervisory control circuit of the transmission-side optical switching device 900 and from the supervisory control circuit 50 of the receive-side optical switching device apparatus 950 to the operating system 930 respectively. Therefore, the operating system 930 can supervise the state of connection of each optical optical switching device 910 and 920, thereby improving reliability of the optical transmission system.

The system shown here is an example of the system to which the optical switching device according to the invention is applied. The optical optical switching device according to the invention is also applicable to the system other than the system shown here, for example to the mesh or the like.

Finally, another light source that is applicable as a supervisory light source will be described.

Figure 6:
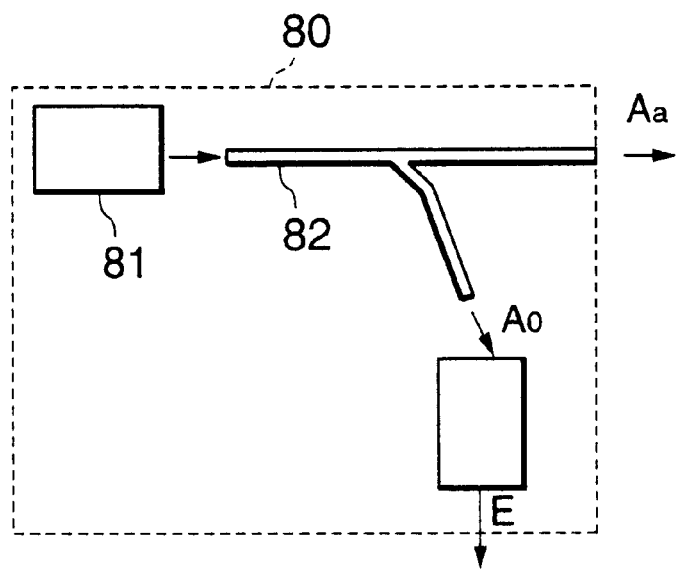
FIG. 6 is a schematic block diagram of a light source that can be used as a supervisory light source for the optical cross connect apparatus according to the invention.

FIG. 6 is a schematic block diagram of the light source that is usable as a supervisory light source.

The supervisory light source 80 comprises a LED (Light Emitting Diode) 81, an optical fiber 82 for dividing the light emitted from the LED 81 into lights $A_0$, $A_a$ in the two directions, and a photodetector 83 for generating status signals E from a light $A_0$ emitted from the optical fiber 82. In case where the supervisory light source 80 is used instead of the supervisory light source shown in FIG. 1 to FIG. 4, the light $A_a$ emitted from the optical fiber 82 is guided to the supervisory switching section of the optical switching module, and status singal E from the photodetector 82 is supplied to the supervisory control device.

Figure 7:
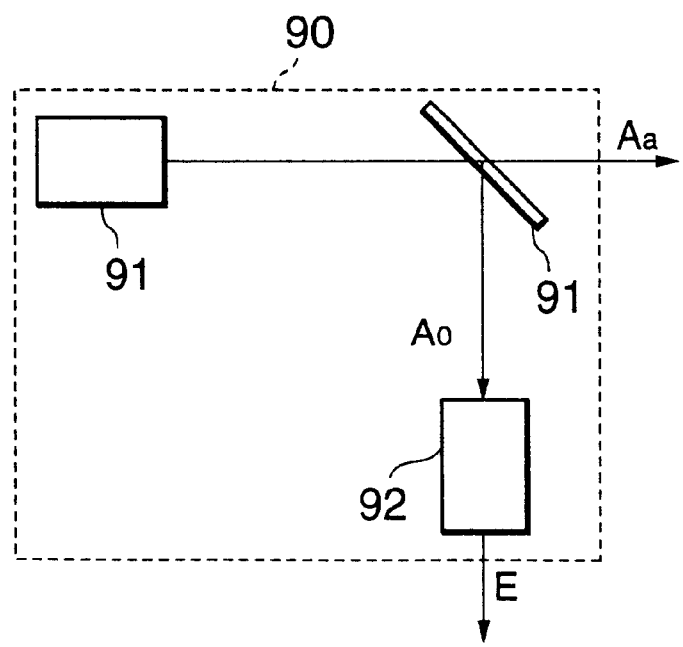
FIG. 7 is a schematic block diagram of a light source that can be used as a supervisory light source of the optical cross connect apparatus according to the invention.

FIG. 7 is a schematic block diagram showing another light source that can be used as a supervisory light source.

The supervisory light source 90 comprises a LED (Light Emitting Diode) 91, a half mirror 91 for dividing a light emitted from the LED 91 into the transmitted light $A_a$ and the reflected light $A_0$, and a photodetector 92 for generating supervised information E from the light $A_0$ reflected from the half mirror 91. In case where the supervisory light source 90 is used instead of the supervisory light sources shown in FIG. 1 to FIG. 4, the light $A_a$ transmitted through the half mirror 91 is guided to the supervisory switching section in the optical switching module and status signal E obtained from the photodetector 92 is supplied to the supervisory control device.

What is claimed is:

1. An optical switching device comprising:
    a first optical switching module including a first light switching section for switching the input of an incoming light or the destination of a received light and a second light switching section to be switched conjointly with said first switching section;
    a second optical switching module including a third light switching section for switching the input of a coming light or the destination of a received light and a fourth light switching section to be switched conjointly with said third light switching section;
    an optical star coupler for dividing the received light into a light to be supplied to said first switching section in said first optical switching module and a light to be supplied into said third switching section in said second optical switching module;
    a first light source for emitting a light to be supplied to said optical star coupler;
    a first receiver for detecting a light emitted from said first switching section in said first optical switching module and supplying supervised information according to the detected result; and
    a second receiver for detecting a light emitted from said third switching section in said second optical switching module and supplying supervised information according to the detected result.

2. The optical switching device as set forth in claim 1, wherein said first receiver comprises:
    a photodetector for converting a light from said first switching section in said first optical switching module into electrical signals; and
    a discrimination decision circuit for comparing the output from said photodetector with the threshold value and supplying the compared result as said supervised information.

3. The optical switching device as set forth in claim 1, further comprising a supervisory control circuit for receiving said supervised information and controlling the action of said first optical switching module according to said supervised information.

4. The optical switching device as set forth in claim 2, further comprising a supervisory control circuit for receiving said supervised information and controlling the action of said first optical switching module according to said supervised information.

5. The optical switching device as set forth in claim 1, further comprising:
    a second light source for emitting a light; and
    a light switch for selectively supplying a light from said first light source and a light from said second light source into said optical star coupler.

6. The optical switching device as set forth in claim 2, further comprising:
    a second light source for emitting a light; and
    a light switch for selectively supplying a light from said first light source and a light from said second light source into said optical star coupler.

7. The optical switching device as set forth in claim 3, further comprising:
    a second light source for emitting a light; and
    a light switch for selectively supplying a light from said first light source and a light from said second light source into said optical star coupler.

8. The optical switching device as set forth in claim 4, further comprising:
    a second light source for emitting a light; and
    a light switch for selectively supplying a light from said first light source and a light from said second light source into said optical star coupler.

9. An optical cross connect apparatus comprising:
    a first optical switching module including a first light switching section for switching the input of a coming light or the destination of a received light and a second light switching section to be switched conjointly with said first switching section;
    a second optical switching module including a third light switching for switching the destination of an incoming light or a received light and a fourth light switching section to be switched conjointly with said third light switching section;
    an optical star coupler for dividing the received light into a light to be supplied to said first switching section in said first optical switching module and a light to be supplied into said third switching section in said second optical switching module;
    a first light source for emitting a light to be supplied to said optical star coupler;
    a first receiver for detecting a light emitted from said first switching section in said first optical switching module and supplying supervised information according to the detected result; and
    a second receiver for detecting a light emitted from said third switching section in said second optical switching module and supplying supervised information according to the detected result.

10. A method for supervising an optical switching module comprising the steps of:
    supplying lights divided by an optical star coupler respectively to a first switching section of two optical switching modules including a first light switching section for switching the input of a incoming light or the destination of a received light and a second light switching section to be switched conjointly with said first switching section; and detecting a light supplied by said each first switching section of said two optical switching modules and discriminating the state of said optical switching module according to the detected result.

11. The method for supervising as set forth in claim 10, wherein the step of detecting a light supplied by said each first switching section comprises the steps of:

converting light supplied from said each first switching section into electrical signals at a photodetector associated with said each first switching section; and comparing the output from said each photodetector with the threshold value and discriminating the state of said each optical switching module according to the compared result.

12. The method for supervising as set forth in claim 10, further comprising a step of controlling the action of said optical switching module according to the result of discrimination of the state of said each optical switching module.

13. The method for supervising as set forth in claim 11, further comprising a step of controlling the action of said optical switching module according to the result of discrimination of the state of said each optical switching module.

14. The method for supervising as set forth in claim 10, wherein lights coming from two light sources are selectively supplied into said optical star coupler by a light switch.

15. The method for supervising as set forth in claim 11, wherein lights coming from two light sources are selectively supplied into said optical star coupler by a light switch.

16. The method for supervising as set forth in claim 12, wherein lights coming from two light sources are selectively supplied into said optical star coupler by a light switch.

17. The method for supervising as set forth in claim 13, wherein lights coming from two light sources are selectively supplied into said optical star coupler by a light switch.

* * * * *